(12) United States Patent
Brugerolle et al.

(10) Patent No.: US 8,065,879 B2
(45) Date of Patent: Nov. 29, 2011

(54) THERMAL INTEGRATION OF OXYGEN PLANTS

(75) Inventors: Jean-Renaud Brugerolle, Neuchatel (CH); Bao Ha, San Ramon, CA (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 560 days.

(21) Appl. No.: 12/171,766

(22) Filed: Jul. 11, 2008

(65) Prior Publication Data

US 2009/0178408 A1    Jul. 16, 2009

Related U.S. Application Data

(60) Provisional application No. 60/950,649, filed on Jul. 19, 2007.

(51) Int. Cl.
*F01K 25/06* (2006.01)
*F01K 25/08* (2006.01)
*F01K 25/00* (2006.01)
*F25J 3/00* (2006.01)

(52) U.S. Cl. ............... 60/649; 60/651; 60/671; 62/640; 62/645

(58) Field of Classification Search ............ 60/645, 60/649; 62/640, 643, 648–652
See application file for complete search history.

(56) References Cited

U.S. PATENT DOCUMENTS

| | | | |
|---|---|---|---|
| 3,950,957 A | 4/1976 | Zakon | |
| 4,224,045 A | 9/1980 | Olszewski et al. | |
| 5,040,370 A | 8/1991 | Rathbone | |
| 5,076,837 A | 12/1991 | Rathbone et al. | |
| 5,081,845 A | 1/1992 | Allam et al. | |
| 5,231,837 A * | 8/1993 | Ha | 62/646 |
| 5,317,862 A | 6/1994 | Rathbone | |
| 5,388,395 A | 2/1995 | Scharpf et al. | |
| 5,421,166 A | 6/1995 | Allam et al. | |
| 5,617,715 A * | 4/1997 | Beer et al. | 60/783 |
| 5,635,541 A | 6/1997 | Smith et al. | |
| 6,009,723 A | 1/2000 | Fidkowski et al. | |

(Continued)

FOREIGN PATENT DOCUMENTS

EP    1043557    10/2000

(Continued)

OTHER PUBLICATIONS

PCT Search Report for PCT/IB2008/052863.

(Continued)

*Primary Examiner* — Thomas Denion
*Assistant Examiner* — Christopher Jetton
(74) *Attorney, Agent, or Firm* — Elwood L. Haynes

(57) ABSTRACT

A process for the integration of a cryogenic air separation plant and an oxy-combustion power plant is presented. This process includes producing a pressurized nitrogen stream and a pressurized oxygen stream, burning a fuel stream thereby generating a steam stream from a boiler feed water stream, wherein the stream is used for work expansion within the oxy-combustion power plant. This process also includes heating the pressurized nitrogen stream and the pressurized oxygen stream with a compressed air stream, thereby forming a heated pressurized nitrogen stream and a heated pressurized oxygen stream. This process also includes heating the heated pressurized nitrogen stream to form a hot pressurized nitrogen stream, work expanding the hot pressurized nitrogen stream to a lower pressure thereby forming a hot exhaust nitrogen stream and recovering energy, and heating the boiler feed water stream by indirect heat exchange with the hot exhaust nitrogen stream.

9 Claims, 9 Drawing Sheets

U.S. PATENT DOCUMENTS

| | | |
|---|---|---|
| 6,116,052 A | 9/2000 | Ha et al. |
| 6,263,659 B1 | 7/2001 | Dillon, IV et al. |
| 6,282,901 B1 * | 9/2001 | Marin et al. ............ 60/649 |
| 6,568,185 B1 * | 5/2003 | Marin et al. ............ 60/649 |
| 6,619,041 B2 * | 9/2003 | Marin et al. ............ 60/653 |
| 6,776,005 B2 | 8/2004 | Fuentes et al. |
| 7,011,695 B2 * | 3/2006 | Moreau et al. ............ 95/96 |

FOREIGN PATENT DOCUMENTS

| | | |
|---|---|---|
| FR | 2803221 | 7/2001 |

OTHER PUBLICATIONS

PCT Search Report and Written Opinion for PCT/IB2008/052863.

* cited by examiner

THERMAL INTEGRATION OF OXYGEN PLANTS

CROSS-REFERENCE TO RELATED APPLICATION

The present application claims the benefit of U.S. Provisional Application Ser. No. 60/950,649, filed Jul. 19, 2007, herein incorporated by reference in its entirety for all purposes.

BACKGROUND

It is believed that there are global warming effects that are being caused by the introduction of increased carbon dioxide into the atmosphere. One major source of carbon dioxide emission is the flue gas that is exhausted as a result of a power generation plant's combustion process. Therefore, there have been several efforts by governments and utility companies worldwide, to reduce these emissions.

There are two principal types of power plants that are based on combustion processes: coal combustion and natural gas combustion. Both of these processes produce carbon dioxide as a byproduct when generating power. Efforts have been made to increase the efficiency of the burner, and therefore the basic combustion process itself. The intent of these efforts has been to reduce carbon monoxide (the result of imperfect combustion), oxides of nitrogen, and other pollutants. However, since the production of carbon dioxide and water are the basic products of the chemical reaction of combustion, the most efficient technique to minimize the carbon dioxide emission is to capture as much of the carbon dioxide as possible as it is being created by the power plants. In order to truly maximize the efficiency of this technique, existing coal combustion plants, which represent a large portion of the power generation plants worldwide, must also be targeted. The oxy-combustion technique is very interesting, and has significant advantages, since it can be adapted to existing facilities.

Traditional power plants use air as the source of oxidant to combust the fuel (typically coal). Steam is generated by indirect heat exchange with the hot combustion products. The steam is then expanded in turbines to remove useful energy and thereby produce power. The combustion process produces carbon dioxide as a by-product, which is mixed with the residual nitrogen of the combustion air. Due to the high content of nitrogen in the inlet air (78 mol %), the carbon dioxide is diluted in the flue gas. To insure full combustion, the power plants must also run with an excess air ratio that further dilutes the carbon dioxide in the flue gas. The concentration of carbon dioxide in the flue gas of an air combustion plant is typically about 20 mol %.

This dilution of the carbon dioxide increases the size and the power consumption of any carbon dioxide recovery unit. Because of this dilution, it becomes very costly and difficult to recover the carbon dioxide. Therefore, it is desirable to produce flue gas with at least about 90% to 95 mol % carbon dioxide, in order to minimize the abatement cost. The current technology for carbon dioxide recovery from flue gas utilizes amine contact tower to scrub out the carbon dioxide. However, the high amount of heat that is needed to regenerate the amine and extract the carbon dioxide reduces the amine processes cost effectiveness.

In order to avoid the dilution of carbon dioxide in the nitrogen, the power generation industry is switching to an oxy-combustion process. Instead of utilizing air as an oxidant, high purity oxygen (typically about 95% purity or better) is used in the combustion process. The combustion heat is dissipated in the recycled flue gas concentrated in the carbon dioxide. This technique makes it possible to achieve a flue gas containing between about 75 mol % and 95 mol % carbon dioxide. This is a significant improvement over the previous concentration of about 20 mol %, which is obtained with air combustion. The purity of carbon dioxide in oxy-combustion's flue gas ultimately depends on the amount of air leakage into the system and the purity of oxygen being utilized. The necessary high purity oxygen is supplied by an air separation unit.

Since pure oxygen, hence power input and capital cost, is required in the oxy-combustion process to facilitate the capture of carbon dioxide, the whole process, including the oxygen plant, the power plant itself, and related integrated concept must be very efficient to minimize the power consumption. Otherwise, the economics of the carbon dioxide recovery will become unattractive to the operator of the power generation plant. In summary, the carbon dioxide capture with oxy-combustion is appealing in terms of pollution abatement, however in order to achieve it, the capital expenditure and the power input must be minimized to avoid a prohibitive increase in power cost.

Over the years, there have been numerous efforts to reduce the cost of the air separation plant and in particular the production of oxygen. Since free atmospheric air is used as feed for the plant, the cost of oxygen is directly related to the power consumption and equipment cost of compressors, cold box, distillation, purification. With large quantities of oxygen being used for power generation (oxy-combustion and IGCC) oxygen plant size is increasing rapidly to 7-10 thousand tonnes per day requiring multiple trains of oxygen. In petrochemical applications (partial oxidation, Gas-to-Liquid, Coal-to-Liquid etc.), the need for oxygen is very large and reaching 20-30 thousand tonnes per day.

It is typical for oxygen plant used in oxy-combustion for pulverized coal power plant that low purity oxygen at about 95 mol % is the main product and there is no need for nitrogen gas. Without nitrogen production, it is not possible with traditional technique to co-produce pressurized nitrogen to improve the efficiency of the system. The power consumption of such oxygen plant is directly related to the air pressure feeding the cryogenic distillation column system. The lower the pressure, the more efficient the air separation plant. For this type of application, the air pressure is usually about 3-4 bar abs.

Waste nitrogen from such oxygen plant must be generated at low pressure for atmospheric venting in order not to waste pressure energy. The piping and exchangers of waste nitrogen circuit must therefore be oversized to have low pressure drop otherwise the air pressure must be raised, hence resulting in higher power consumption.

By operating the air separation process at low feed air pressure at about 3-4 bar abs., the power consumption can be minimized when compared with traditional oxygen plants operated at 5-6 bar abs. However, at low feed air pressure, the front end adsorption equipment for moisture and carbon dioxide removal becomes problematic since the lower the pressure, the more moisture is carried in the feed air. Adsorption is exothermic and with more moisture being adsorbed, higher temperature rise in adsorbent bed cannot be avoided, which is not favorable for adsorption. Adsorption capacity is also further reduced at low pressure due to low partial pressure of CO2, requiring lower temperature air cooling equipment to minimize the adsorbent quantity.

It can be seen from the above description that the air separation equipment cost increases rapidly when the air pressure is lowered to reduce power consumption. Low pressure drop results in expensive voluminous piping, exchanger, and distillation columns. Adsorption equipment becomes very large and very costly.

As mentioned above, the plant size requirement is also increasing and the larger equipment, in particular the distillation columns and adsorption bottles, exceeds the limit of transportability. Cryogenic equipment capacity must be reduced to cope with maximum transportable equipment size such that higher number of trains is needed. It is obvious higher equipment and installation costs will occur.

If the nitrogen product of the low pressure column can be utilized at elevated pressure (for example as in the case of integrated oxygen plant for Integrated Coal Gasification Combined Cycle (IGCC) application) then an alternative solution would be the elevated pressure process. In this process, the low pressure column's pressure is raised to 3-6 bar abs instead of 1.3-1.6 bar of the low pressure plant. Due to the elevated pressure of the low pressure column, the feed air pressure becomes much higher at about 10-16 bar abs. When compared with the low pressure solution, the elevated pressure air separation process offers several advantages:

more compact front end purification unit due to higher feed air pressure smaller distillation columns, especially the low pressure column, due to higher operating pressure smaller heat exchangers and piping due to higher operating pressure more compact equipment means more capacity per shippable train The main penalty of the elevated pressure process is the much higher power consumption due to higher air pressure. If the pressure of nitrogen product from the plant can not be valorized, or if there is no need for pressurized nitrogen, then this approach cannot be justified economically under most circumstances due to the expense of the additional power consumption.

It is useful to note that the separation energy of oxygen for elevated pressure process is about 0.2-0.24 kWh/Nm3 or 20-30% better than the separation energy of low pressure plant (about 0.26-0.30 kWh/Nm3), taken into account the energy credit of nitrogen product. This type of elevated pressure air separation process is described in many publications and patents such as U.S. Pat. Nos. 4,224,045, 5,081,845, 5,421,166, 5,231,837, 6,116,052 etc.

Because of the advantages of elevated pressure cycle, there exist many techniques developed to efficiently recover the energy of pressurized nitrogen in order to utilize this cycle when pressurized nitrogen is not required.

U.S. Pat. No. 3,950,957 describes a process wherein the nitrogen from the elevated pressure oxygen plant is heated by recovering heat from the air compressor outlet. The nitrogen is further heated by the flue gas of an air and fuel combustion of a steam generator; it is then expanded in a turbine for power recovery. The exhaust of the turbine is sent back to the steam generator for further heat recovery. By exchanging low level heat at the outlet of the turbine with high level heat supplied to heat the nitrogen prior to expansion, thermal efficiency of the boiler can be preserved and additional power can be recovered from the turbine to drive the air compressor.

U.S. Pat. No. 4,224,045 describes the injection of the nitrogen into the gas turbine to recover its pressure energy.

U.S. Pat. No. 5,040,370 describes an arrangement wherein the oxygen of an air separation plant is used in an external process to produce a hot stream of fluid of temperature less than 600° C., which is used to heat nitrogen prior to expansion for power recovery.

U.S. Pat. No. 5,076,837 describes a similar approach as U.S. Pat. No. 5,040,370 for application with a chemical process.

U.S. Pat. No. 5,317,862 proposes moisturizing and heating nitrogen then expanding it to recover power for blast furnace application. Almost all of the techniques were developed using integration with a gas turbine to recover the pressure energy of the nitrogen produced by the elevated pressure process.

U.S. Pat. No. 5,388,395 proposes to expand nitrogen for power recovery. Power savings is further achieved by mixing the chilled nitrogen of the turbine exhaust with gas turbine's air inlet to lower the inlet temperature.

U.S. Pat. No. 5,635,541 proposes to use the elevated pressure plant for remote gas process such as Gas-to-Liquid (GTL) to minimize equipment cost, the nitrogen is simply expanded for power recovery.

U.S. Pat. No. 6,009,723 suggests expanding the heated nitrogen to drive some ASU's compressor.

U.S. Pat. No. 6,263,659B1 suggests heating nitrogen by heat exchange with the gas turbine exhaust then expanding in case there is no combined steam cycle.

U.S. Pat. No. 6,282,901 describes a process that introduces pressurized oxygen and fuel on the shell side of the heat recovery boiler, then work expand the resulting flue gas recover energy.

In coal combustion boiler the hot flue gas at about 2000° C. generated from the combustion of coal with oxygen is used to vaporize boiler feed water at high pressure to produce steam. Steam is then expanded to low pressure (vacuum) in multiple steam turbines to produce electricity. The boiler utilizes very hot flue gas to generate superheated steam as high as 570° C. Because of the large temperature difference, the ratio of flue gas flow to the steam flow is quite small. By vaporizing steam at multiple pressures, the low flow ratio of flue gas can be optimized for high temperature water vaporization. However, at the low temperature range, the low flow ratio of flue gas is not sufficient to preheating the boiler feed water and providing heat for de-aeration. In fact, in case of supercritical steam cycles, almost 70% of the total heat duty is provided for this medium and low grade heat up to the critical temperature of water at about 340° C. To complement for this shortage, steam extraction at various interstage levels are required. This steam extraction, even at low pressure, deprives the turbines of the expanding steam, hence reducing the power output of the power plant and its thermal efficiency. A typical arrangement for steam extraction and heating of boiler feed water is illustrated in FIG. 1.

Based on the above there is a need to provide an integration process between the oxygen plant and the oxy-combustion coal power plant such that an elevated pressure oxygen process can be used to reduce the capital cost of the oxygen plant. The thermal integration must also provide efficient power recovery of the pressurized nitrogen and improving the performance of the boiler.

SUMMARY

In one aspect of the present invention, a process for the integration of a cryogenic air separation plant and an oxy-combustion power plant is presented. This process includes producing a pressurized nitrogen stream and a pressurized oxygen stream within said cryogenic air separation plant. This process also includes burning a fuel stream thereby generating a steam stream from a boiler feed water stream, wherein said stream is used for work expansion within said oxy-combustion power plant. This process also includes heating said pressurized nitrogen stream and said pressurized oxygen stream with a compressed air stream that is extracted from the air compressor of said cryogenic air separation plant, thereby forming a heated pressurized nitrogen stream and a heated pressurized oxygen stream. This process also includes burning a fuel stream with said heated pressurized oxygen stream to produce a flue gas stream. This process also includes heating said heated pressurized nitrogen stream to form a hot pressurized nitrogen stream. This process also includes work expanding said hot pressurized nitrogen stream to a lower pressure thereby forming a hot exhaust nitrogen stream and recovering energy. And this process also includes heating said boiler feed water stream by indirect heat exchange with said hot exhaust nitrogen stream.

In another aspect of the present invention, a process for the integration of a cryogenic air separation plant and a furnace generating heat for glass melting is presented. This process includes producing a pressurized nitrogen stream and a pressurized oxygen stream within said cryogenic air separation plant. This process also includes heating said pressurized oxygen stream with a compressed air stream that is extracted from the air compressor of said cryogenic air separation plant, thereby forming a heated pressurized oxygen stream. This process also includes burning a fuel stream with said heated pressurized oxygen stream to produce a flue gas stream. This process also includes heating said heated pressurized nitrogen stream by indirect heat exchange with said flue gas to form a hot pressurized nitrogen stream. This process also includes work expanding said hot pressurized nitrogen stream to a lower pressure to form a hot exhaust nitrogen stream and recovering energy. And this process includes heating said pressurized nitrogen stream by indirect heat exchange with said hot exhaust nitrogen stream to form a heated pressurized nitrogen stream.

BRIEF DESCRIPTION OF THE DRAWINGS

The invention may be understood by reference to the following description taken in conjunction with the accompanying drawings, in which.

DETAILED DESCRIPTION

Figure 1:
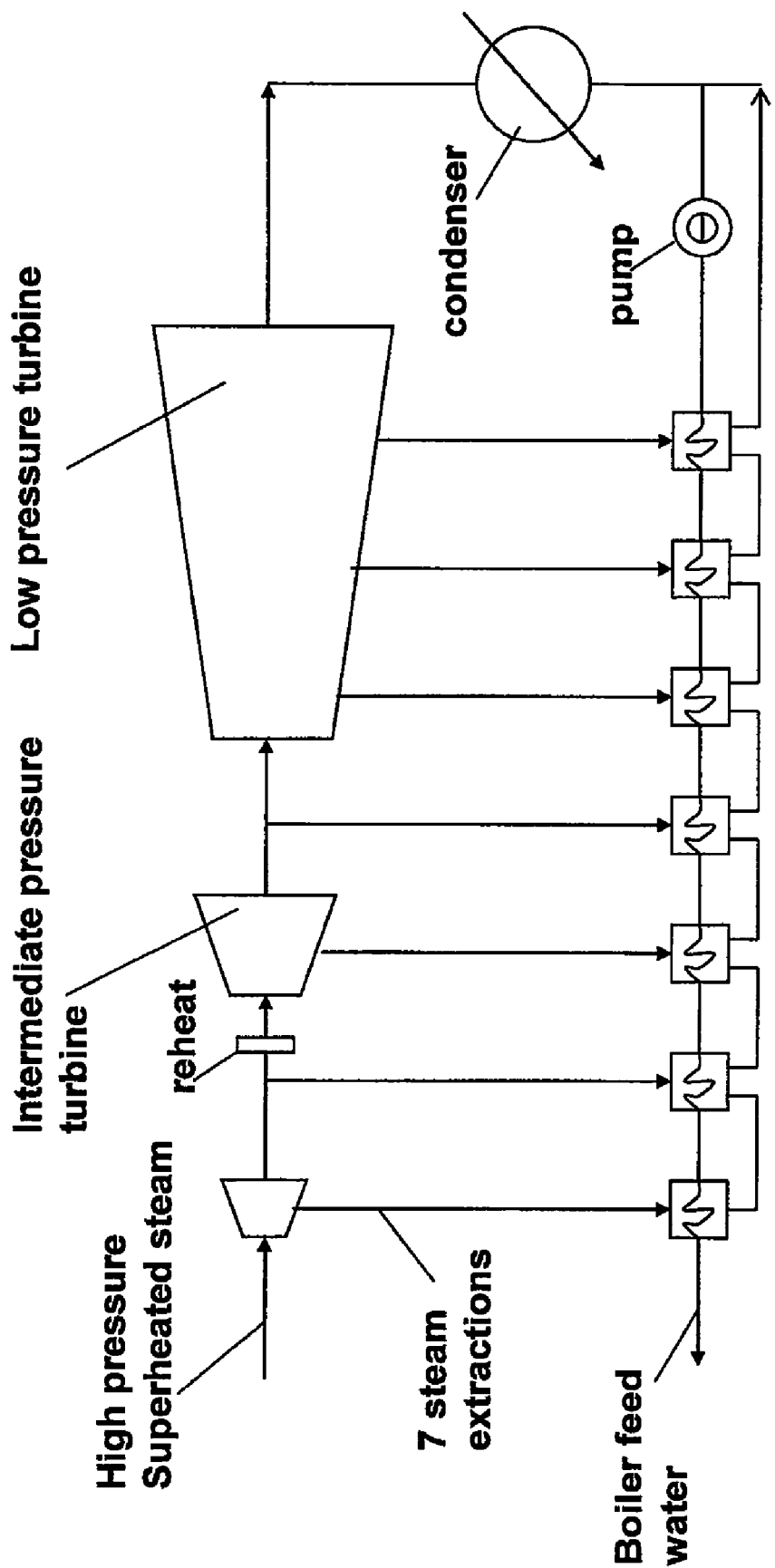
FIG. 1 illustrates a stylized representation of a typical arrangement for steam extraction and heating of boiler feed water known in the prior art.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

This invention applies in particular to the thermal integration of an oxygen production plant by cryogenic distillation and a thermal oxy-combustion process such as oxy-combustion coal fired power plant, blast furnace, glass furnace etc. The combustion process utilizes the oxygen produced by the oxygen plant. The integration improves the efficiency of the global system and lowers the investment cost.

Figure 2:
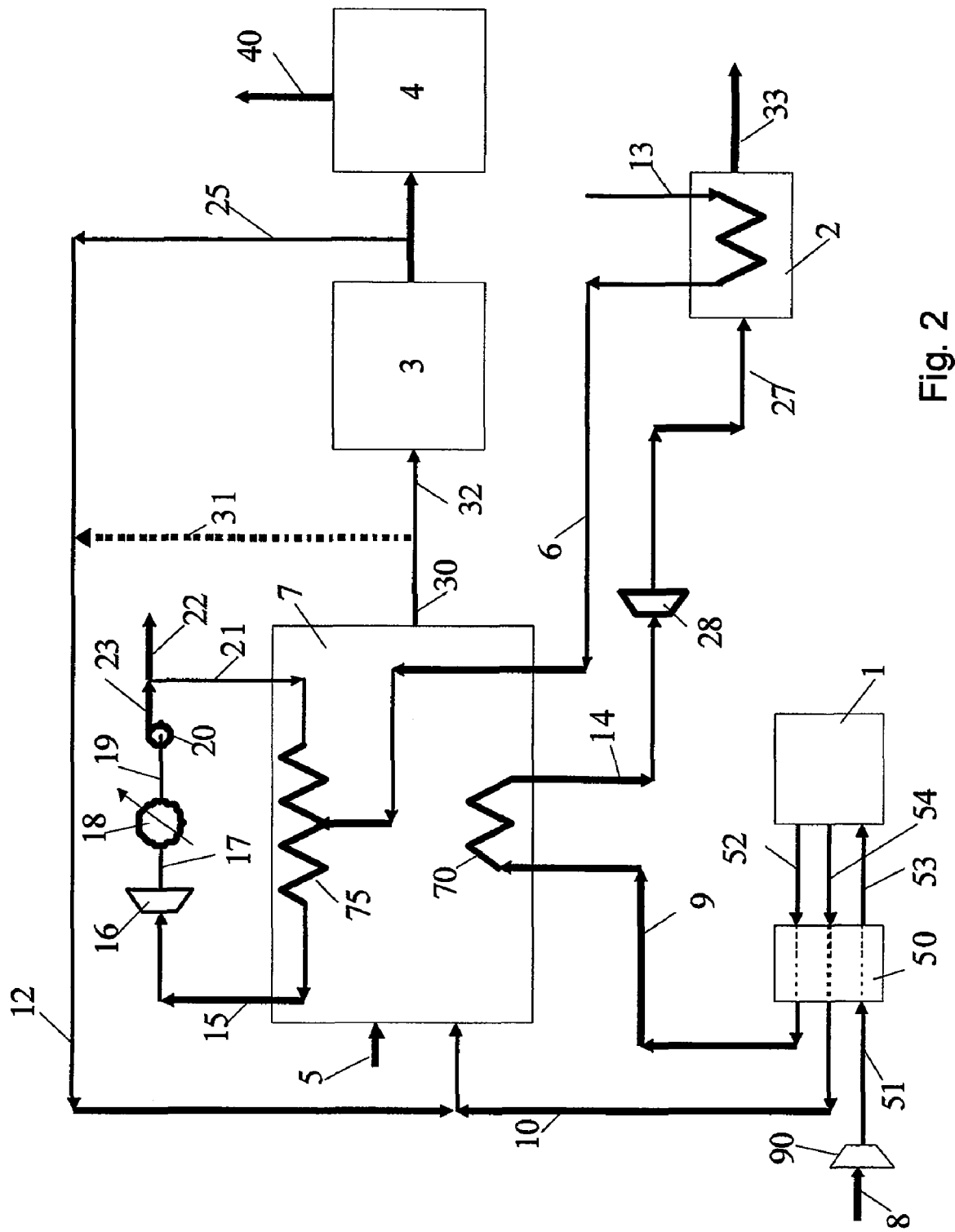
FIG. 2 illustrates a stylized representation of the thermal integration of an oxygen production plant by cryogenic distillation and a thermal oxy-combustion process such as oxy-combustion coal fired power plant, blast furnace, glass furnace etc in accordance with one embodiment of the present invention.

The integration is described in FIG. 2. Atmospheric air 8 is compressed in air compressor 90 to form stream 51 which may have a pressure of about 11 bar abs. In order to recover low grade compression heat in a fashion that would improve the thermal efficiency of the overall cycle, in one embodiment compressor 90 is an adiabatic type compressor, i.e. without intercoolers, to maximize the outlet temperature of the compressed air stream. Stream 51 may thus have a temperature of about 350° C., and is then cooled in exchanger 50 and fed the air separation unit 1 (ASU) as cooled, compressed feed air stream 53. Stream 53 is treated and separated into oxygen product 54 at a pressure of about 1.8 bar abs. and a pressurized nitrogen stream 52 at a pressure of about 4.7 bar abs. In one embodiment, pressurized nitrogen may also be extracted from the distillation column system at two different pressures. The higher pressure nitrogen stream may be work expanded to an intermediate pressure to drive a cold compressor, wherein this cold compressor may then compress the lower pressure stream to that intermediate pressure so that only a single nitrogen stream is available. Streams 52 and 54 exchange heat with stream 51 in exchanger 50 to form nitrogen stream 9 and oxygen stream 10, both with a resulting temperature of about 330° C. Oxygen stream 10 is then fed the oxy-combustion boiler 7 to provide the oxygen molecules for the combustion of pulverized coal 5. The boiler in an oxy-combustion plant operates under a slight vacuum or very close to atmospheric pressure. The shell side of boiler 7 is not pressurized. The flue gas stream is at about atmospheric pressure. In one embodiment, this flue gas stream has a pressure of between 12.5 millibar gauge and 50 millibar gauge. As explained earlier, atmospheric air is not used in an oxy-combustion boiler. In some embodiments, the oxygen may be mixed with a portion of the recycled CO2 flue gas 12; while the remaining recycled CO2 flue gas may be injected directly into the burner.

The combustion of coal and oxygen generates a very hot flue gas, typically with a temperature of over 2000° C. This very hot flue gas is then used to heat and vaporize boiler feed water 21 in exchanger train 75 and thus producing high pressure steam. Steam may be produced at multiple pressure levels to optimize the boiler performance. For super-critical steam cycle, steam pressures are above 221 bar. Nitrogen stream 9 may be heated by the flue gas to a temperature of about 730° C. and then may be expanded to about atmospheric pressure in expansion turbine 28 for power recovery. The exit stream 27 of this expansion turbine 28 may have a temperature of about 450° C. Exit stream 27 may be used to heat boiler feed water 13 in exchanger 2 to yield hot water 6 which the sent to exchanger train 75 for further heating and steam generating. High pressure steam 15 is then expanded in steam turbine 16 to produce power for electricity generation. Steam turbine 16 can comprise multiple turbines with side extractions, reheats arrangement, etc as will be known and understood by one skilled in the art. The turbine outlet will typically be at vacuum pressure provided by steam condenser 18, which will condense this steam turbine outlet steam. This steam condensate 19 then pumped to high pressure by pump 20 and returned to the boiler 7 as boiler feed water 21. The cooled nitrogen 33 at the outlet of exchanger 2 is vented to atmosphere.

In one embodiment of one arrangement of the heat recovery boiler 7 exhaust, a portion 31 of flue gas 30, consisting mostly of $CO_2$ and water vapor, at the exit of boiler 7 is recycled back to the front end of boiler 7. Another portion 32 of flue gas is treated in unit 3 wherein it is cooled, and its moisture content is reduced. The dust and acid gases contained in 32 are also reduced. In one embodiment, flue gas stream 25 may also recycled back to the front end of boiler 7. The remaining portion of flue gas then enters the $CO_2$ recovery unit 4 wherein it is treated to yield $CO_2$ stream 40 for capture and disposition. In one embodiment, by extracting high level heat from the flue gas for the heating of nitrogen and work expanding the heated nitrogen additional power can be recovered. The extracted high level heat, typically above about 730° C., is compensated by recovering low level heat, typically below about 330° C., of the air compression and from the exhaust of the nitrogen turbine, such that the overall efficiency of the system can thereby be improved.

Figure 3:
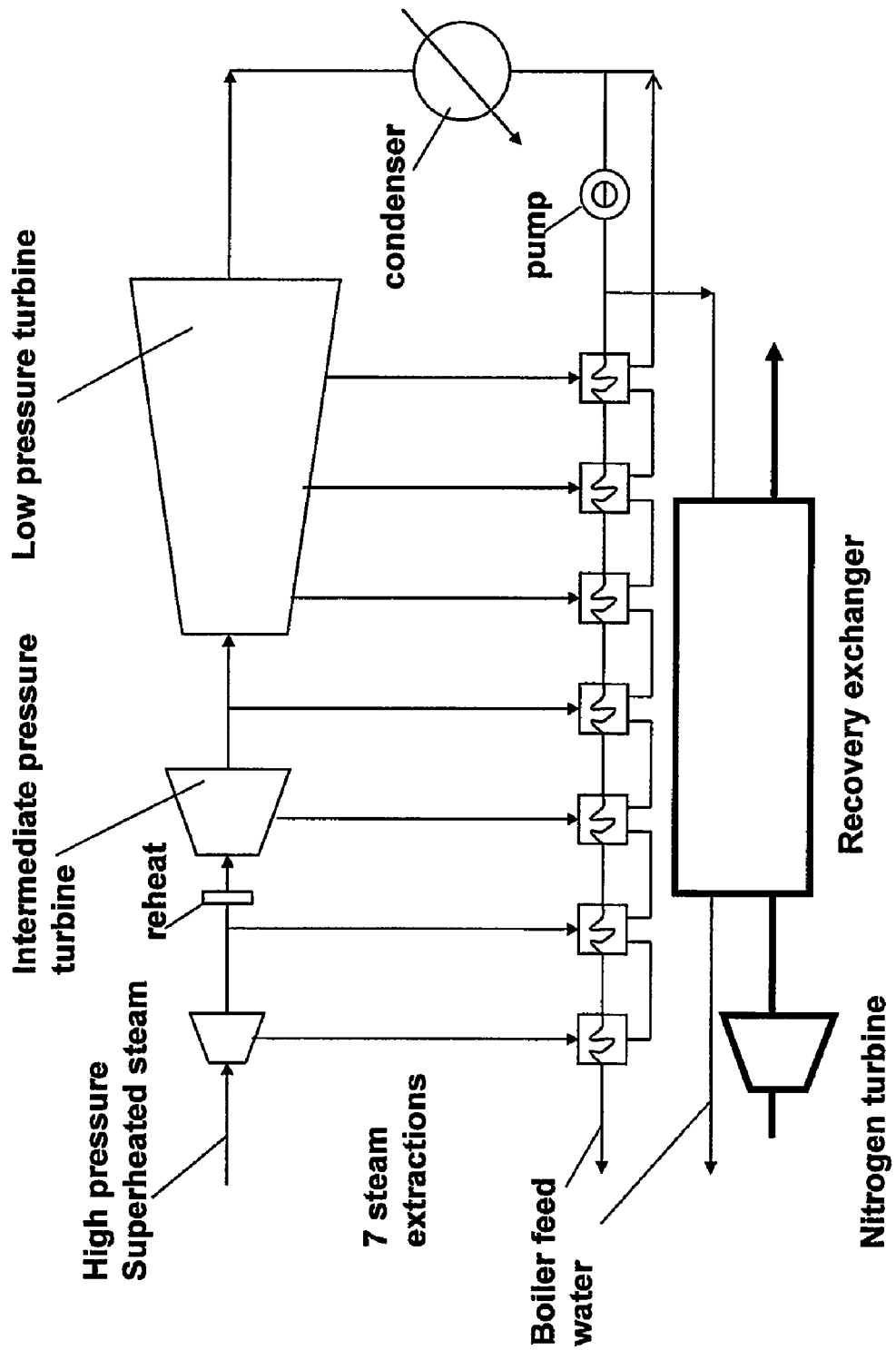
FIG. 3 illustrates a stylized representation of the heat recovery of the nitrogen turbine exhaust in accordance with one embodiment of the present invention.

It is possible to heat the nitrogen to well above 600° C., perhaps to about 1290° C., as suggested in U.S. Pat. No. 3,950,957, followed by expansion to increase greatly the power recovery of the nitrogen turbine, however special heat resisting material or pebble heater or internally fired gas heater must be used for the high temperature heater. At the present, these types of nitrogen heaters, to heat the nitrogen above about 750° C., are not yet available economically for the volume of nitrogen flow and pressure at which the typical current air separation plant operates. Furthermore, when the inlet temperature approaches about 1290° C., gas turbine technology must also be used for the nitrogen turbine in order to be compatible with such high temperature, since traditional hot gas turbines for power recovery are not currently designed to exceed about 750° C. at the inlet. Also, when the inlet temperature of the turbine approaches about 1290° C., the exhaust temperature of the nitrogen turbine is also much higher, typically at a temperature of about 900° C., which then requires more complex heat recovery schemes such as vaporization and super-heating to efficiently recover this high grade heat. FIG. 3 illustrates one embodiment of the heat recovery of the nitrogen turbine exhaust.

Figure 4:
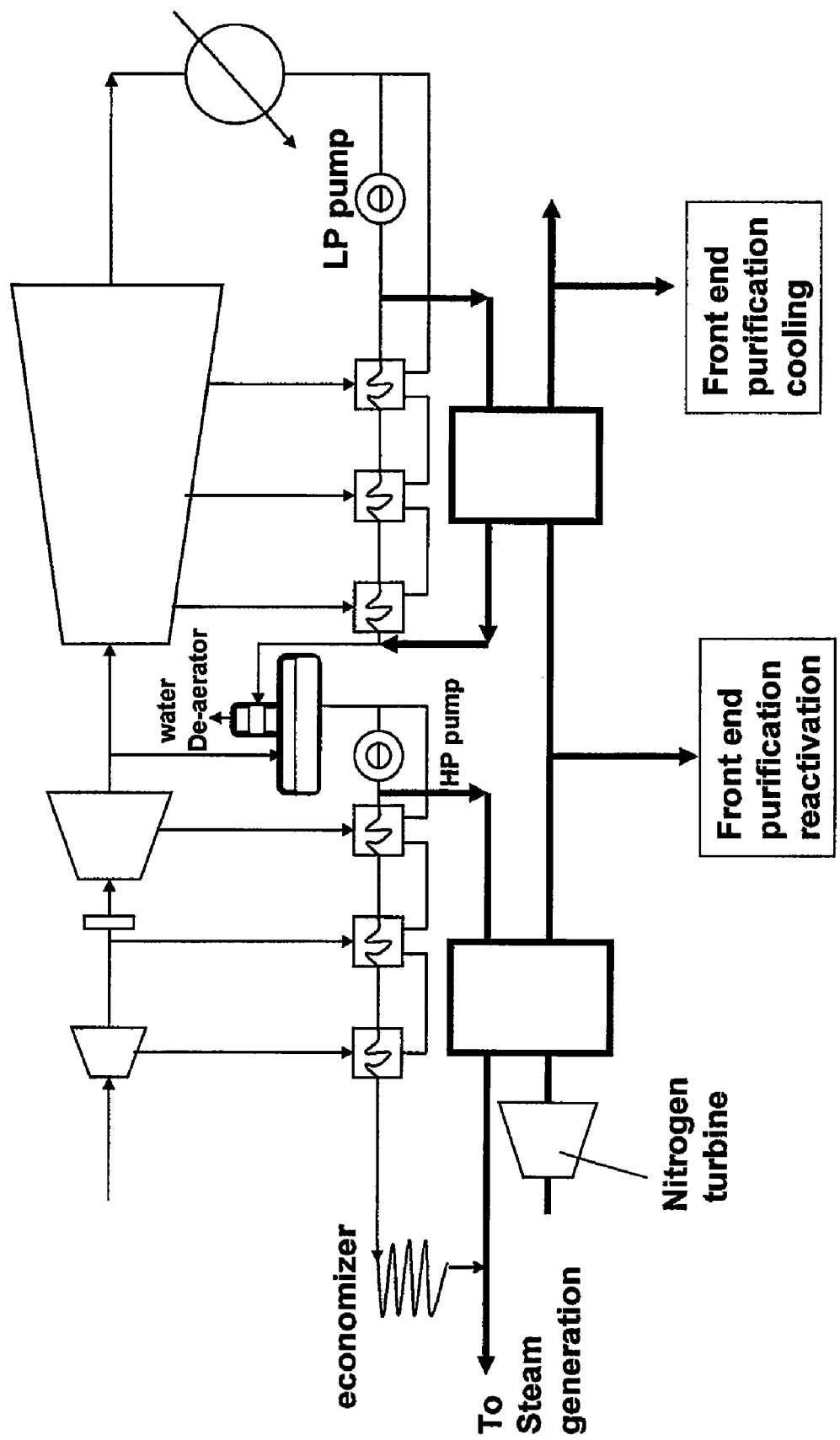
FIG. 4 illustrates a stylized representation of another embodiment of the present invention.

The front end purification unit of the cryogenic oxygen plant for water and $CO_2$ removal requires reactivation service to restore its adsorption capability after saturation. Clean, dry, and hot nitrogen is needed to perform this service. The embodiment described in FIG. 4 shows an arrangement wherein the hot low pressure nitrogen from the nitrogen turbine exhaust can be extracted from the heat recovery exchanger to be used as regeneration gas for adsorption bed heating and cooling.

In another embodiment of the cryogenic oxygen production process, it is preferable to produce pressurized nitrogen at 2 different pressures. The thermal integration of the invention can be adapted for this situation in an embodiment described in FIG. 5. The stream numbering system is similar as in FIG. 2. The oxygen plant produces two nitrogen streams, stream 52 at about 4 bar abs. and 55 at about 10 bar abs. Streams 52 and 55 are heated in recovery exchanger 50 to yield streams 9 and 56 respectively. Stream 56 is heated by the flue gas of the boiler to higher temperature and then expanded to about 4 bar abs. in turbine 58 for power recovery. The exit gas 59 of turbine 58 is then mixed with stream 9 and the combined stream is again heated by flue gas to higher temperature at about 730° C. then expanded in turbine 28 for power recovery. The exhaust stream 27 of turbine 28 is sent to the heat recovery exchanger 2 where it transfers heat to the boiler feed water.

Figure 5:
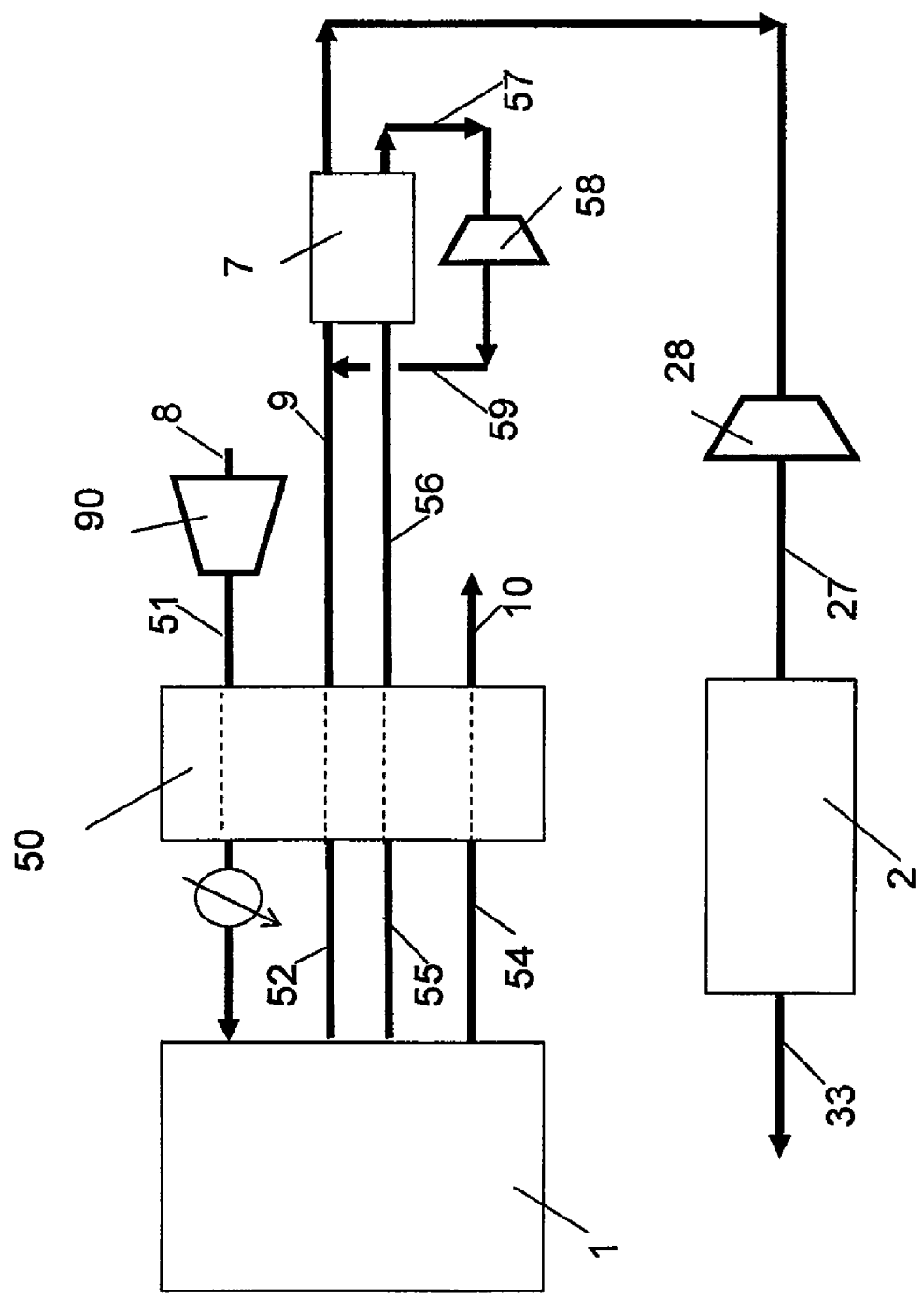
FIG. 5 illustrates a stylized representation of another embodiment of the present invention.
Figure 6:
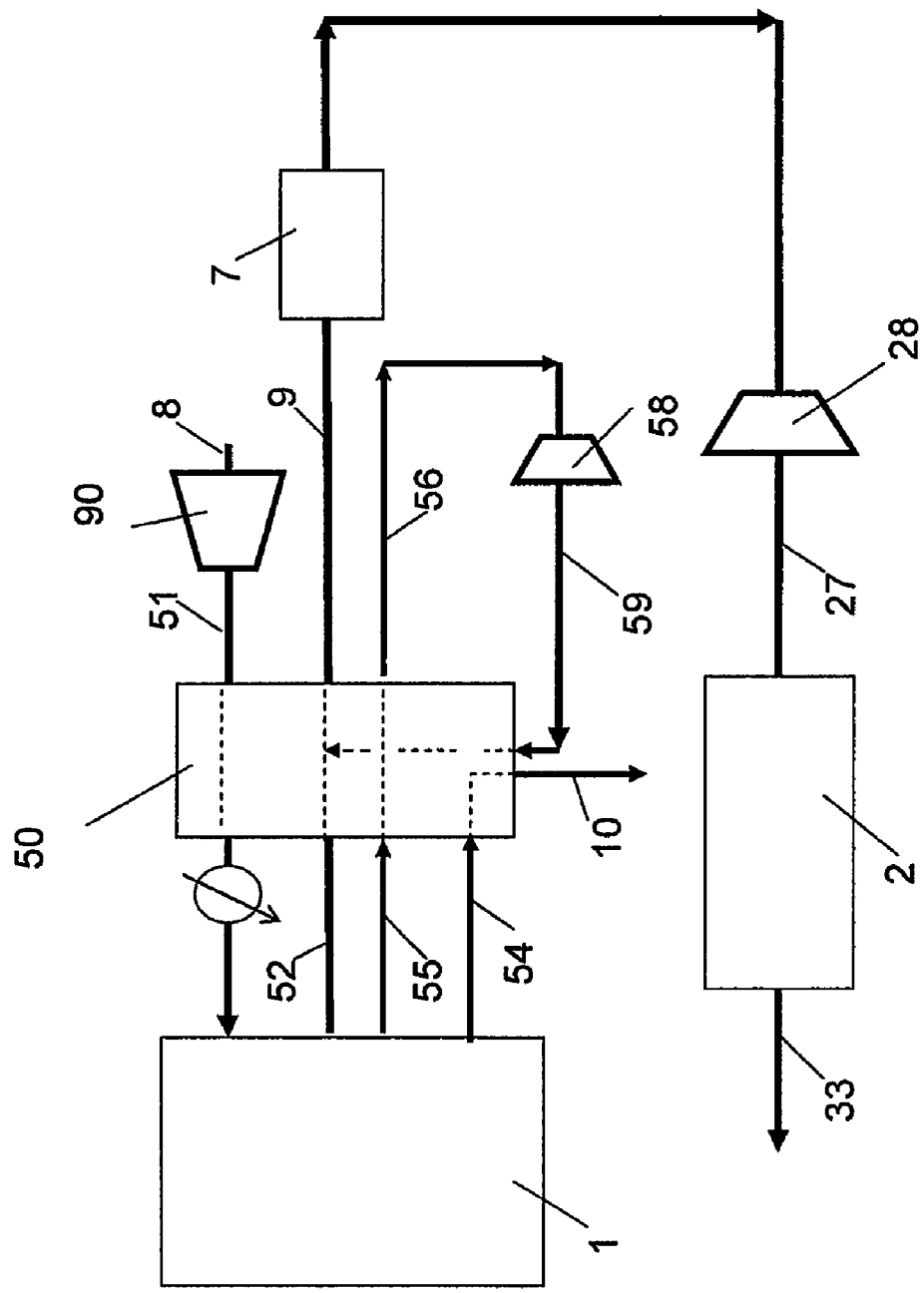
FIG. 6 illustrates a stylized representation of another embodiment of the present invention.

In another embodiment similar to FIG. 5 and described in FIG. 6, instead of being heated by flue gas, stream 56 is expanded to lower pressure in turbine 58, the turbine exhaust 59 is mixed with the lower nitrogen pressure stream and the combined stream is again heated in recovery heat exchanger 50 before heating by flue gas.

Figure 7:
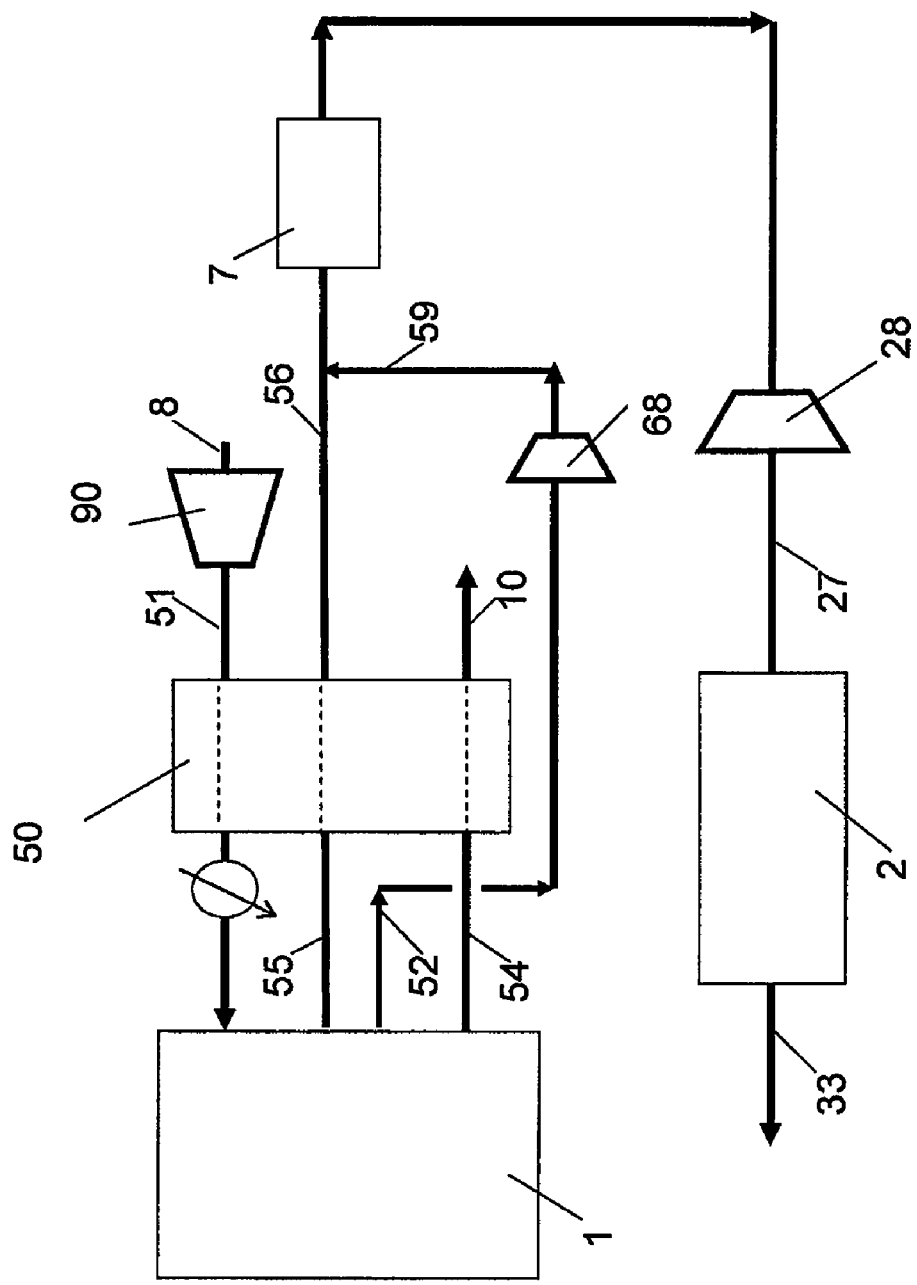
FIG. 7 illustrates a stylized representation of another embodiment of the present invention.

FIG. 7 describes another embodiment wherein the lower pressure nitrogen stream 9 is further compressed in compressor 68 and mixed with the higher pressure nitrogen stream 56 and the combined stream is the heated by flue gas.

Figure 9:
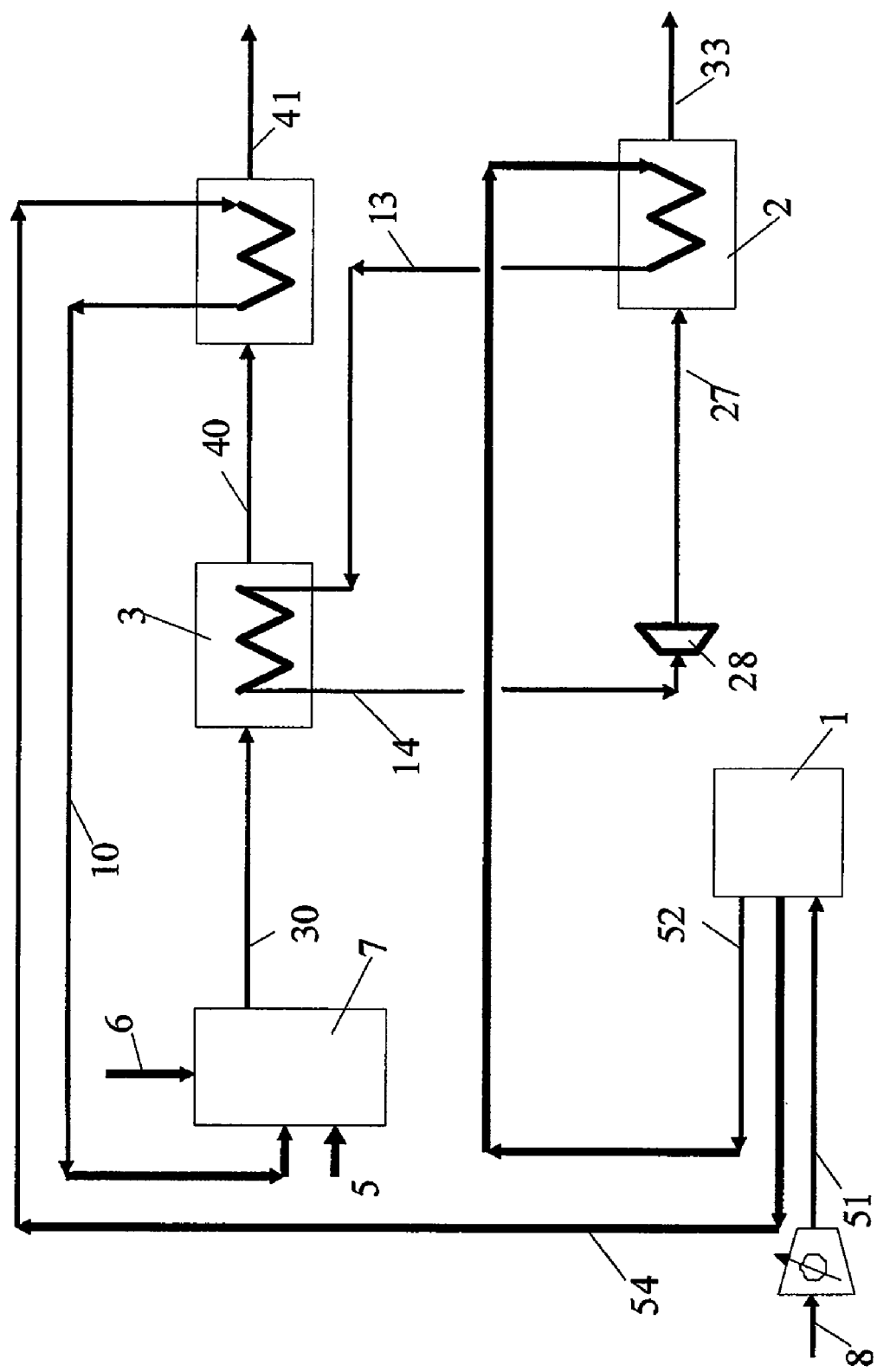
FIG. 9 illustrates a stylized representation of another embodiment of the present invention.

The oxyfuel glass furnace described in FIG. 9 is another application of oxy-combustion wherein the natural gas 5 fuel is combusted with pre-heated oxygen 10 produced by an air separation unit 1. The high temperature flue gas generated by the combustion is used to provide the heat for melting the raw material 6. At the outlet of the furnace, the flue gas 30, still at very high temperature of about 1450° C., is used to heat the pre-heated re-pressurized nitrogen 13 to about 750° C., to form hot nitrogen gas 14, which is then work expanded in turbine 28 for power recovery. Exhaust 27 of turbine 28 is heat recovered by indirect heat exchange with pressurized nitrogen 52 from the air separation plant 1.

Figure 8:
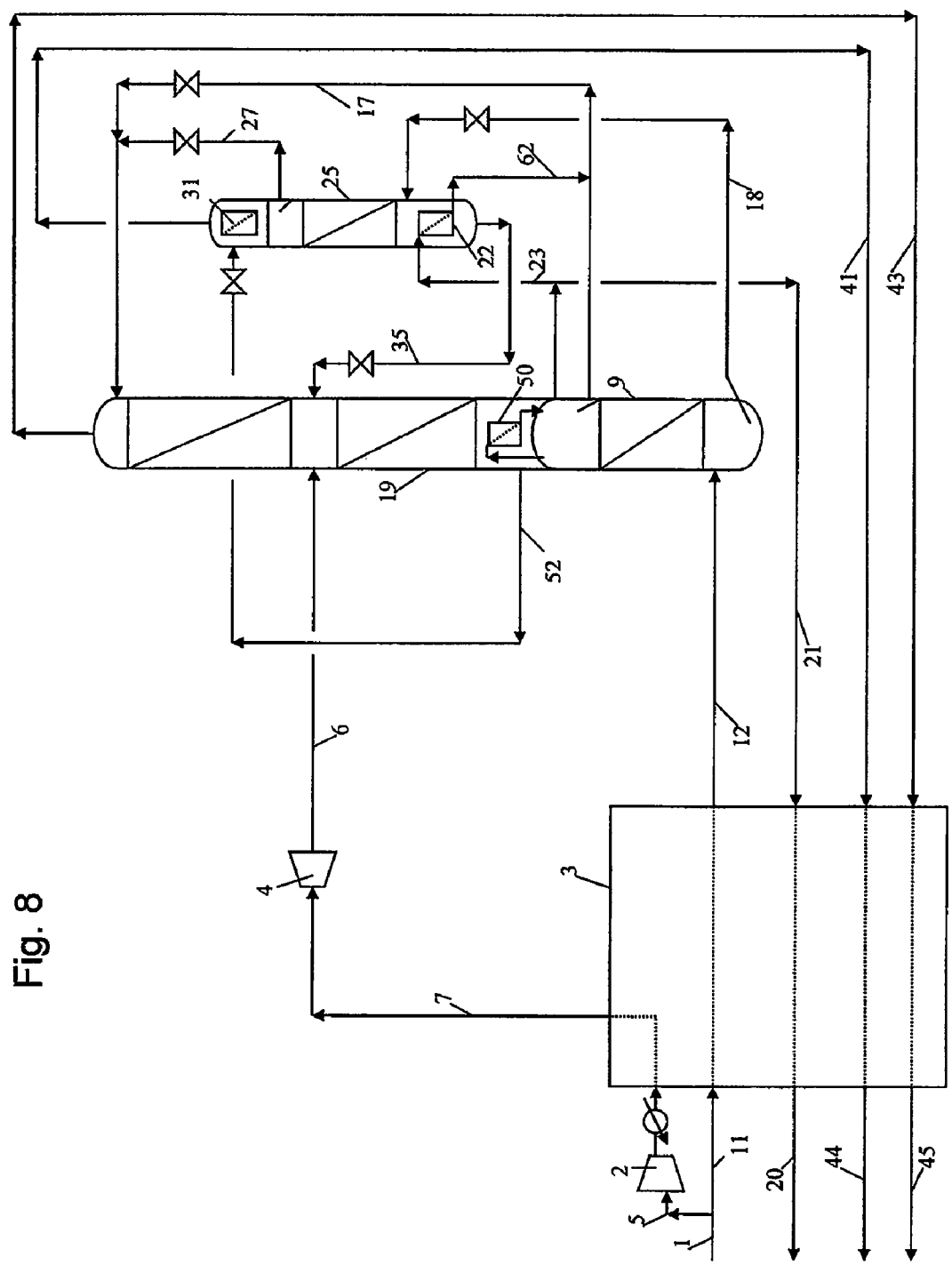
FIG. 8 illustrates a stylized representation of another embodiment of the present invention.

Since oxy-combustion uses cryogenic oxygen as oxidant instead of the free oxygen molecules contained in atmospheric air, the thermodynamic efficiency of the air separation unit is of utmost importance to the overall cost efficiency of the oxy-combustion process. To this end, it is preferable to utilize the triple-column process scheme similar to the process described in FIG. 8 (U.S. Pat. No. 6,116,052).

In this process, cool feed air 12 is treated in the high pressure column 9 to produce first nitrogen rich gas at the top and first oxygen enriched liquid 18 at the bottom. The oxygen enriched liquid 18 is sent to an intermediate pressure column 25 equipped with top condenser and bottom reboiler to produce second nitrogen rich gas and second oxygen enrich liquid 35. The first and second oxygen enriched liquids are sent to the low pressure column to produce liquid oxygen 52 at the bottom and third nitrogen rich gas 43 at the top. This liquid oxygen 52 is then vaporized to low pressure about 2 bar abs in the top condenser of the intermediate column against condensing second nitrogen rich gas to yield gaseous oxygen 41, which is then warmed and recovered as oxygen product 44. The first nitrogen rich gas condenses against the vaporizing liquid oxygen of the bottom of the low pressure column and the vaporizing second oxygen enriched liquid of the bottom of the intermediate pressure column. The intermediate column operates at a pressure higher than the low pressure column's pressure and lower than the high pressure column's pressure. A portion of first nitrogen rich gas is recovered as high pressure nitrogen 20 at about 10 bar abs. The third nitrogen rich gas is recovered as medium pressure nitrogen product 45 at about 4 bar abs. By using this type of process and the integrated scheme of this invention to recover the pressure energy of the high pressure and medium pressure nitrogen streams, the achieved thermodynamic efficiency of oxygen production is much improved.

What is claimed is:

1. A process for the integration of a cryogenic air separation plant and an oxy-combustion power plant, comprising:
    producing a pressurized nitrogen stream and a pressurized oxygen stream within said cryogenic air separation plant; wherein said cryogenic separation plant has an air compressor outlet pressure of about 11 bar abs and produces oxygen at a pressure of approximately 1.8 bar abs;
    burning a fuel stream thereby generating a steam stream from a boiler feed water stream, wherein said stream is used for work expansion within said oxy-combustion power plant;
    heating said pressurized nitrogen stream and said pressurized oxygen stream with a compressed air stream that is extracted from the air compressor of said cryogenic air separation plant, thereby forming a heated pressurized nitrogen stream and a heated pressurized oxygen stream;
    burning a fuel stream with said heated pressurized oxygen stream to produce a flue gas stream, wherein said flue gas stream is at about atmospheric pressure;
    heating said heated pressurized nitrogen stream to form a hot pressurized nitrogen stream;
    work expanding said hot pressurized nitrogen stream to a lower pressure thereby forming a hot exhaust nitrogen stream and recovering energy; and
    heating said boiler feed water stream by indirect heat exchange with said hot exhaust nitrogen stream,
wherein said pressurized nitrogen stream comprises a high pressure nitrogen stream and a medium pressure nitrogen stream, wherein both said high pressure nitrogen stream and said medium pressure nitrogen stream are produced within said cryogenic air separation plant, further comprising:
    heating said high pressure nitrogen stream, said medium pressure nitrogen stream and said pressurized oxygen stream with said compressed air stream thereby forming a heated high pressure nitrogen stream, a heated medium pressure nitrogen stream, and heated pressurized oxygen stream;
    burning a fuel stream with said heated pressurized oxygen stream to produce a flue gas stream;
    heating said heated high pressure nitrogen stream to form hot high pressure nitrogen stream;
    work expanding hot high pressure nitrogen stream to a lower pressure thereby forming a hot exhaust medium pressure nitrogen stream thereby recovering a first portion of energy;
    mixing said hot exhaust medium pressure nitrogen stream with said heated medium pressure nitrogen stream to form a warm combined medium pressure nitrogen stream;
    heating said warm combined medium pressure nitrogen stream to form a hot combined medium pressure nitrogen stream;
    work expanding said hot combined medium pressure nitrogen stream to form a hot exhaust combined nitrogen stream thereby recovering a second portion of energy; and
    heating said boiler feed water stream by indirect heat exchange with said hot exhaust combined nitrogen stream.

2. The process of claim 1 wherein the heating of said hot high pressure nitrogen stream is by indirect heat exchange with said flue gas.

3. The same process as claim 1 further comprising:
    heating said high pressure nitrogen stream, said medium pressure nitrogen stream and said pressurized oxygen stream with said compressed air stream thereby forming a heated high pressure nitrogen stream, a heated medium pressure nitrogen stream and a heated pressurized oxygen stream;
    burning a fuel stream with said heated pressurized oxygen stream to produce a flue gas stream;
    work expanding said heated high pressure nitrogen stream to a lower pressure forming a hot exhaust medium pressure nitrogen stream thereby recovering a first portion of energy;
    mixing said hot exhaust medium pressure nitrogen stream with said heated medium pressure nitrogen stream to form a warm combined medium pressure nitrogen stream;
    heating said warm combined medium pressure nitrogen stream to form a hot combined medium pressure nitrogen stream;
    work expanding said hot combined medium pressure nitrogen stream to form a hot exhaust combined nitrogen stream and thereby recovering a second portion of energy; and
    heating said boiler feed water stream by indirect heat exchange with said hot exhaust combined nitrogen stream.

4. The process of claim 1 further comprising:
    heating said high pressure nitrogen stream, said medium pressure nitrogen stream and said compressed oxygen stream with said compressed air stream thereby forming a first heated high pressure nitrogen stream, a heated medium pressure nitrogen stream and a heated pressurized oxygen stream;
    burning a fuel stream with said heated pressurized oxygen stream to produce a flue gas stream;
    further compressing said heated medium pressure nitrogen stream to higher pressure to form a second heated high pressure nitrogen stream;
    mixing said first heated high pressure nitrogen stream and said second heated high pressure nitrogen stream thereby forming a combined heated high pressure nitrogen stream;
    heating said combined heated high pressure nitrogen stream to form a hot combined medium pressure nitrogen stream;
    work expanding said hot combined medium pressure nitrogen stream to form a hot exhaust combined nitrogen stream and recover energy; and
    heating said boiler feed water stream by indirect heat exchange with said hot exhaust combined nitrogen stream.

5. The process of claim 1 wherein the distillation column system comprises a high pressure column, a low pressure column and an intermediate pressure column operated at a pressure lower than the pressure of said high pressure column and higher than the pressure of said low pressure column.

6. The process of claim 5 wherein:
    a. said intermediate column has a top condenser; and
    b. liquid oxygen is extracted at the bottom of said low pressure column and vaporized in said top condenser to produce said compressed gaseous oxygen steam.

7. The process of claim 1 wherein the temperature of said hot pressurized nitrogen stream does not exceed 800° C.

8. The process of claim 1 wherein said fuel is coal.

9. The process of claim 1 wherein said boiler feed water stream and said hot exhaust nitrogen stream exchange heat in a heat exchanger, and wherein a portion said hot exhaust nitrogen stream is extracted from said heat exchange at a temperature between 80° C. and 300° C.

* * * * *